United States Patent Office 3,248,101
Patented Apr. 26, 1966

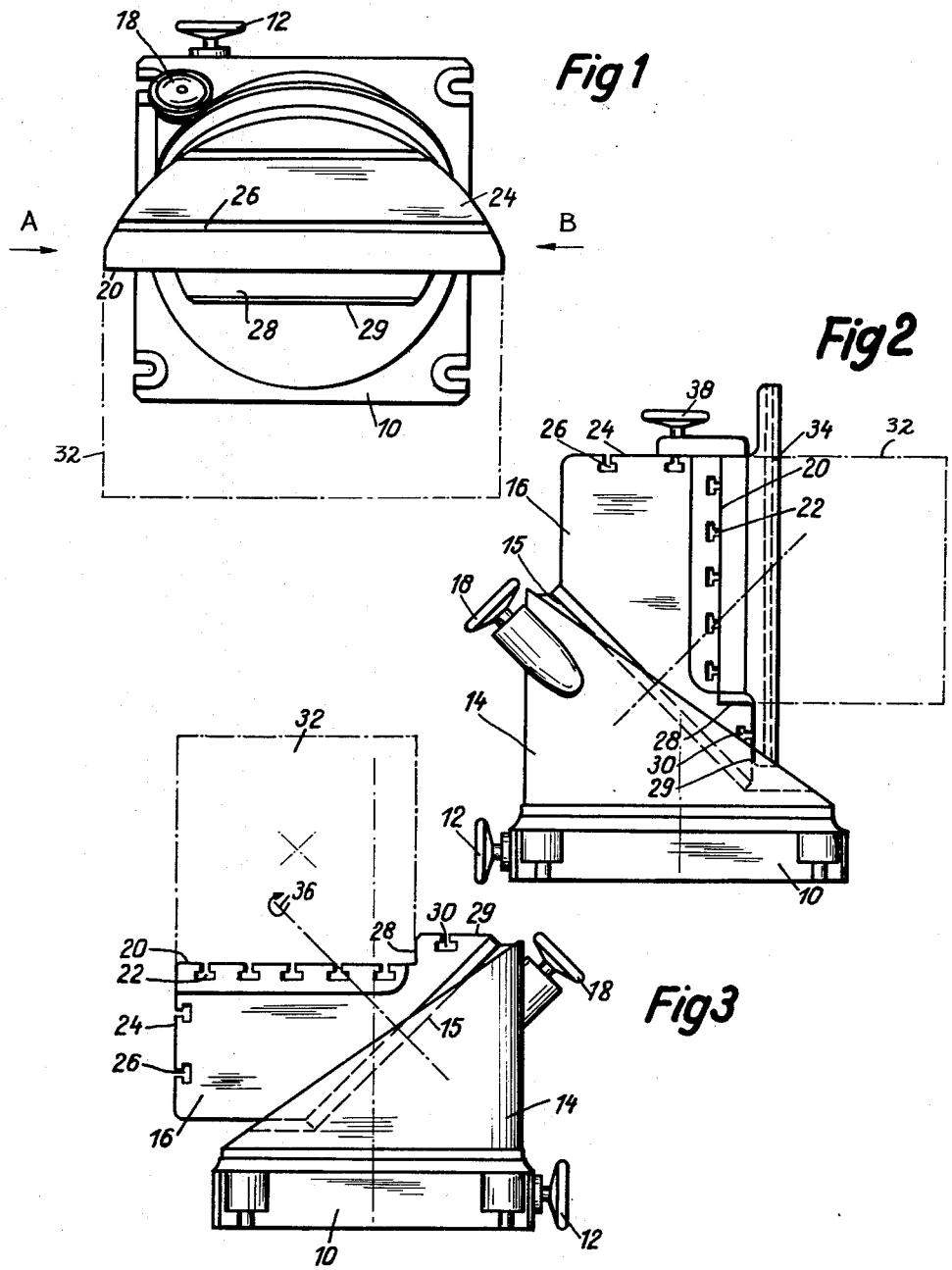

3,248,101
DUAL SWIVEL AXES CLAMPING TABLE
Johann Müller and Horst Lanzenberger, Munich, Germany, assignors to Hans Deckel, Munich, Germany, and Friedrich Wilhelm Deckel, Zug, Switzerland
Filed Feb. 14, 1963, Ser. No. 258,482
Claims priority, application Germany, Feb. 20, 1962, D 38,243
5 Claims. (Cl. 269—73)

This invention relates broadly to clamping tables, and more particularly to a clamping table for machine tools in which the clamping surface can be swiveled around a first axis inclined at 45° to the plane of the clamping surface, and also around a second axis inclined at 45° to the first axis.

Clamping tables of this same general type, that is, the type having a clamping surface which can be swiveled about two separate axes disposed at 45° to each other, are familiar to those skilled in the art, but with the dual swivel clamping tables, known in the prior art, the workpiece clamped on the clamping surface must be raised or lowered a substantial distance on the swinging of the clamping surface about the first axis which is inclined at 45° to the horizontal plane. This is particularly disadvantageous in the processing of large workpieces because an especially strong power source is required to drive the table to swing the workpiece with a raising or lowering component to the desired position relative to the machine tool.

In addition, clamping tables of the prior art of this type have still another disadvantage. Upon swiveling the workpiece and clamping surface about the first axis, that is the axis inclined at 45° to the horizontal, the workpiece changes its position in space rather drastically. For instance, if a workpiece is centrally clamped on the clamping surface, upon swinging the clamping surface from the vertical plane into the horizontal plane the workpiece in addition to being raised at least half the width of the clamping surface is also displaced backwards by an approximately equally great amount. If the prior art device is used as a clamping table for a machine tool, then the machine tool requires particularly long infeed adjustment possibilities, in order to compensate for the rather drastic displacement of the workpiece relative to the tool after swinging the workpiece from one position to another.

It is therefore an object of the present invention to provide a construction of dual swivel axes clamping table which overcomes these disadvantages posed by prior art clamping tables of this type.

Another object of the invention is to provide a construction of clamping table having dual swivel axes disposed at 45° to each other wherein the swivel axis of the clamping surface extends in the vicinity of the center of gravity of the masses which are swiveled around this axis.

Still another object of the invention is to provide a construction of dual swivel axes clamping table which is easily and manually adjustable even when carrying large workpieces and which requires only slight forces for the acceleration of the masses to swing the workpiece around the first axis and to overcome table friction during table adjustments.

A further object of the invention is to provide a construction of dual swivel axes clamping table of the character described in which the center of gravity of the workpiece is raised and lowered only slightly during adjustment of the table, and substantially less than in similar prior art clamping tables, so that the table movement process is not essentially hindered either by necessary lifting work nor by liberated potential energy from lowering a workpiece.

Other and further objects of the invention will become apparent from the specification hereinafter following by reference to the accompanying drawings, in which:

FIG. 1 is a top plan view of the clamping table of the invention and particularly showing the clamping surface in the vertical position;

FIG. 2 is a side elevation view of the table of FIG. 1, looking in the direction of arrow A and showing in full lines an auxiliary round turning table connected to the clamping surface and showing in dotted lines the position of a workpiece clamped directly to the clamping surface when the auxiliary table is not utilized; and FIG. 3 is a side elevation view of the table of FIG. 1, looking in the direction of arrow B but showing the clamping surface swiveled to the horizontal position.

Referring to the drawings in greater detail, the clamping table of the invention includes a base plate 10 on which a cylindrical body portion 14 is swiveled or pivotally mounted by means of a second turning axis pivot. Cylindrical portion 14 is rotatable, relative to the base plate 10 about the second axis, by means of hand wheel 12 and conventional gearing which is not shown since such gearing is well known in the art. The upper surface of cylindrical portion 14 is disposed diagonally with the horizontal plane and provides a round slide or bearing surface 15 which is inclined at an angle of 45° to base plate 10 and which is recessed in the lower end of the cylindrical portion diagonal surface by means of conical sloping side walls.

Body portion 16 is pivotally mounted in round slide 15 through a cooperating round slide bearing surface carried thereby and a first swivel axis pivot whose center line is indicated at 36 located centrally of round slide 15 and disposed at right angles thereto and at 45° with the center line of the second turning axis pivot. Body portion 16 is pivotally movable relative to cylindrical pedestal portion 14 about swivel axis 36 by means of handwheel 18, on pedestal portion 14, through conventional type gearing, not shown, which is well known in the art. Main clamping surface 20, of generally rectangular shape, is carried by body portion 16 at an angle of 45° to round slide 15, and is provided with a plurality of conventional type clamping grooves indicated at 22 for clamping a workpiece thereon. On the end of body portion 16 opposite round slide 15 an auxiliary clamping surface 24 is provided, disposed perpendicular to main clamping surface 20 and including chuck grooves 26 therein.

In front of the main clamping surface 20, and on the end of body portion 16 adjacent the round slide 15, a small stepped portion is provided, including a riser 28 which serves as a guide edge for the workpiece on the main clamping surface, and a footboard 29 carrying a single clamping groove 30 and shaped similar to auxiliary clamping surface 24 is useful in clamping the workpiece on the main clamping surface 20, particularly when the workpiece as shown in dot-dash lines at 32 extends up to the guide edge 28. As is apparent from the drawings the workpiece 32 can still be clamped on the clamping surface by use of footboard 29 and appropriate means not shown, even when it projects over the other three sides of clamping surface 20.

The first swivel or turning axis pivot is positioned such that its center line 36 extends as shown in the vicinity of the center of gravity of the combined masses which turn about this axis, namely workpiece 32 and body portion 16. With the weight of these masses thus positioned relative to axis 36 very slight forces are required for accelerating the masses and overcoming the friction of round slide 15 for swinging the workpiece from the vertical to horizontal position, and vice versa.

With prior art clamping tables of this general type, the main clamping surface, corresponding to clamping surface 20 herein, is normally arranged in the plane of the footboard 29; but it has been found that this arrangement has the disadvantages described in the introduction, that is, requiring the workpiece to be raised or lowered a substantial amount in the table manipulation process, thus requiring a strong power source for swinging the clamping surface when a large workpiece is disposed thereon. In the clamping table described herein this problem is avoided since the main clamping surface 20 is displaced inwardly from footboard 29 parallel to itself, in the direction of first swivel axis 36 of the round bearing surface 15 or past this. Thus the center line of the first turning axis 36 does not extend past the main clamping surface 20, as has heretofore been the practice, but rather intersects the clamping surface 20 adjacent its inner edge, that is the edge closest to bearing surface 15, and the workpiece 32, so that it extends into the vicinity of the center of gravity of the mass which rotates about axis 36 consisting of body portion 16 and workpiece 32. As shown it is preferred that the center line of first turning axis 36 intersect the clamping surface 20 inwardly of the midpoint of the width thereof and inwardly of the midpoint of the width of the workpiece clamped centrally on the clamping surface 20. With this arrangement the center of gravity of the workpiece 32 is raised and lowered only slightly when the clamping surface 20 is rotated between the extreme positions shown in FIGS. 2 and 3, but little effort is required for this lifting and lowering since the center of gravity of the workpiece is substantially counterbalanced by the center of gravity of body portion 16.

In FIG. 2, a round rotatable table 34 has been shown, in full lines, connected to the main clamping surface 20 instead of the workpiece 32 being connected directly thereto as shown in dot-dash lines. In this modified arrangement of the clamping table the workpiece is connected to round table 34 which is rotatable by hand wheel 38 through conventional linkage means and this enables the workpiece to be brought into any desired position with respect to a fixed tool. Thus the workpiece is supported by a further clamping surface on the body portion which carries the first or main clamping surface. Since the clamping table of the invention projects relatively far out of the machine bed to which it is connected, such an additional clamping surface can easily be added when desired. It is especially advantageous for taking up supplementary devices such as auxiliary tables, but it is to be understood that other type attachments can be connected thereto.

The second turning axis pivot previously mentioned is positioned such that its center line extends in the vicinity of the center of the largest of the workpieces which can be clamped on the table. The base surface of the largest of the clampable workpieces will normally not be larger than the clamping surface 20 of the table, while the height of the workpiece will correspond to the longest straight line which can be laid out on the clamping surface. This straight line is the diagonal in the case of rectangular clamping tables, and in round clamping tables it corresponds to the diameter of the table. With this arrangement of the second turning axis pivot the distance between the workpiece and a tool remains approximately the same even when the clamping surface 20 is turned 180° about the second turning axis, so that the workpiece does not need to be fed in after the turning procedure.

According to another design feature of the invention the center line of the second turning axis pivot extends a distance from the spatial center of the largest workpiece 32 that can be clamped on the table, with this distance in the case of a clamping table with a rectangular clamping surface such as shown at 20, being substantially equal to half the difference between the length and the width of the clamping surface. This eccentric arrangement makes it possible, when processing a workpiece with a rectangular base surface, for the long side surface of the workpiece after turning about the second turning axis by 90°, to be at substantially the same distance from a fixed tool as the short side surface of the workpiece was before turning.

While the invention has been described in certain preferred embodiments we realize that modifications can be made and it is to be understood that no limitations upon the invention are intended other than those which may be imposed by the scope of the appended claims.

What we claim as new and desire to secure by Letters Patent of the United States, is as follows:

1. A pivotable clamping table of the type used with machine tools including, a pedestal portion, a bearing surface on said pedestal portion, a body portion, a clamping surface for a workpiece connected on said body portion, said clamping surface having inner and outer edge portions with said inner edge portion disposed adjacent said bearing surface, and said body portion pivotally connected to said bearing surface along a swivel axis inclined at an angle of substantially 45 degrees to the plane of said clamping surface and intersecting said clamping surface adjacent the inner edge portion.

2. A pivotable clamping table as set forth in claim 1 in which said bearing surface is inclined at substantially 45 degrees to the horizontal and to the plane of said clamping surface, and said swivel axis disposed normal to said bearing surface.

3. A pivotable clamping table as set forth in claim 1 including a base portion, and said pedestal portion pivotally connected to said base portion along a pivot axis disposed at substantially 45 degrees to said swivel axis.

4. A pivotable clamping table as set forth in claim 3 in which said pivot axis intersects said clamping surface adjacent the inner edge portion when said clamping surface is positioned in a horizontal plane, and is disposed in closely spaced parallel relation with said clamping surface when said clamping surface is in a vertical plane.

5. A pivotal clamping table including, a pedestal portion, a bearing surface on said pedstal portion having end extremities, a body portion pivotally connected to said pedestal portion through said bearing surface, a clamping surface for a workpiece connected on said body portion, and the plane of said clamping surface intersecting said bearing surface at substantially 45 degrees and intermediate the end extremities of said bearing surface.

References Cited by the Examiner
UNITED STATES PATENTS 1,414,970 5/1922 Nelson _____ 269—71 X
3,002,279 10/1961 Miller _____ 33—174 X WILLIAM W. DYER, JR., *Primary Examiner.*
ROBERT C. RIORDON, *Examiner.*